United States Patent
Cardalda-Garcia et al.

(10) Patent No.: US 10,461,869 B1
(45) Date of Patent: Oct. 29, 2019

(54) METHOD FOR DOWNLINK POWER TESTS, TEST SYSTEM AS WELL AS TEST SETUP

(71) Applicant: Rohde & Schwarz GmbH & Co. KG, Munich (DE)

(72) Inventors: Adrian Cardalda-Garcia, Munich (DE); Bledar Karajani, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 16/276,147

(22) Filed: Feb. 14, 2019

(51) Int. Cl.
*H04W 24/06* (2009.01)
*H04B 17/00* (2015.01)
*H04W 24/10* (2009.01)

(52) U.S. Cl.
CPC ........ *H04B 17/0085* (2013.01); *H04W 24/06* (2013.01); *H04W 24/10* (2013.01)

(58) Field of Classification Search
None
See application file for complete search history.

(56) References Cited

U.S. PATENT DOCUMENTS

| | | | | |
|---|---|---|---|---|
| 7,477,877 B2* | 1/2009 | Bednasz | ................ | G01R 29/10 343/702 |
| 7,925,253 B2* | 4/2011 | Breit | .................... | G01R 29/105 455/226.1 |
| 7,995,968 B2* | 8/2011 | Sotoudeh | ........... | H04B 17/3911 455/423 |
| 8,229,344 B1* | 7/2012 | Petersen | .................. | H04K 3/92 455/1 |
| 8,467,756 B2* | 6/2013 | Ozaki | .................... | G01R 29/10 455/115.1 |
| 8,527,229 B2* | 9/2013 | Chang | .................... | G01C 19/00 702/104 |
| 8,600,311 B2* | 12/2013 | Gregg | .................. | H04B 17/309 455/67.11 |
| 8,660,812 B2* | 2/2014 | Gregg | .................... | H04B 17/11 340/7.41 |
| 8,706,044 B2* | 4/2014 | Chang | .................. | H04W 24/06 455/67.11 |
| 8,793,093 B2* | 7/2014 | Mow | .................. | H04B 17/0087 455/67.12 |
| 9,094,840 B2* | 7/2015 | Liu | ........................ | H04B 17/29 |
| 9,319,908 B2* | 4/2016 | Nickel | .................... | G01R 29/10 |
| 9,404,965 B2* | 8/2016 | Nickel | ............... | G01R 31/3025 |
| 9,742,508 B1* | 8/2017 | Kyosti | ................... | H04B 17/12 |
| 10,277,337 B2* | 4/2019 | Bai | ........................ | H04B 17/12 |
| 2013/0178203 A1* | 7/2013 | Venkataraman | ........ | H04W 4/16 455/423 |

(Continued)

*Primary Examiner* — Tuan A Tran
(74) *Attorney, Agent, or Firm* — Christensen O'Connor Johnson Kindness PLLC

(57) ABSTRACT

A method for downlink power tests of a device under test comprising: generating a downlink signal with a predefined downlink power level in a quiet zone at the device under test; measuring a first absolute power level received by the device under test; determining whether the measured first power level lies within a predefined first range; repeatedly measuring subsequent power levels received by the device under test; and determining by the control unit whether the measured subsequent power levels lie within a predefined second range around the measured first power level with respect to the current downlink power level. Further, a test system and a test setup for downlink power tests are shown.

16 Claims, 2 Drawing Sheets

(56) References Cited

U.S. PATENT DOCUMENTS

| | | | | |
|---|---|---|---|---|
| 2014/0160955 A1* | 6/2014 | Lum | .................... | H04W 24/06 370/252 |
| 2014/0315495 A1* | 10/2014 | Joseph | ................. | H04W 24/08 455/67.11 |
| 2016/0212641 A1* | 7/2016 | Kong | ................. | H04B 17/3911 |

* cited by examiner

METHOD FOR DOWNLINK POWER TESTS, TEST SYSTEM AS WELL AS TEST SETUP

FIELD OF THE DISCLOSURE

The disclosure concerns a method for downlink power tests of a device under test, a test system as well as a test setup.

BACKGROUND

In wireless networks, user equipment has to fulfill specific measurement accuracy requirements for an undisturbed and stable use. For this purpose, downlink power tests of a user equipment—which is then the device under test (DUT)—have to be performed. With the advance of the next generation wireless standards (e.g. 5G NR FR2), the power measurements are performed over the air (OTA). However, with OTA measurements the antenna gain of the device under test cannot be easily isolated so that an accurate evaluation of the actual accuracy of the power measurement, i.e. the baseband accuracy, of the device under test is not possible.

Thus, there is a need for a method for downlink power tests of a device under test, a test system as well as a test setup for precisely evaluating the accuracy of the power measurement of the device under test.

SUMMARY

For this purpose or others, a method for downlink power tests of a device under test (DUT) is provided using a test system comprising a signal generator, a control unit and a test chamber having a quiet zone. The method comprises, for example, the following steps:

arranging the device under test in the quiet zone, generating a downlink signal with a predefined downlink power level in the quiet zone by the signal generator, measuring in a first test phase a first absolute power level received by the device under test and transmitting the measured first power level to the control unit, determining by the control unit whether the measured first power level lies within a predefined first range around the predefined downlink power level, if the measured first power level lies within a predefined first range, repeatedly measuring subsequent power levels received by the device under test in a second test phase and transmitting the measured subsequent power levels to the control unit, and determining by the control unit whether the measured subsequent power levels lie within a predefined second range around the measured first power level with respect to the current downlink power level.

By choosing the second range to lie around the measured first power level with respect to the downlink power level of the first test phase, the antenna gain is effectively neglected, as it may be assumed that the antenna gain is constant over the whole test.

The measured first power level with respect to the current downlink power level is preferably the value of the first power level measured in response to the predefined downlink power level of the first phase. If the downlink power level changes compared to the downlink power level of the first phase, the measured first power level with respect to the current downlink power level is shifted by the same amount and direction that the current downlink power level differs from the downlink power level of the first phase.

In some embodiments, the test chamber may be a test chamber for OTA measurements or OTA tests.

In order to evaluate compliance of the device under test with predetermined requirements or standards, the first range and the second range may be defined by predefined measurement accuracy requirements.

The measurement accuracy requirements may be set in a standard, e.g., a 3GPP standard, etc.

For example, the second range is defined by baseband accuracy limits of the predefined measurement accuracy requirements, thus, the compliance to baseband accuracy limits can be tested.

The second range is ±6 dB around the measured first power level, for example.

In an embodiment of the disclosure, the first range includes a permitted antenna gain of the predefined measurement accuracy requirements so that the antenna gain may also be evaluated.

To provide a complete test, the first range may correspond to the sum of the baseband accuracy limits and the permitted antenna gain of the predefined measurement accuracy requirements.

The sum may correspond to the total measurement uncertainty, especially the total RSRP (reference signal received power) measurement uncertainty.

In order to use existing processes, the measured first power level and/or the measured subsequent power levels may be transmitted to the control unit as SS-RSRP reports, e.g., synchronization signal—reference symbol received power reports.

In an embodiment of the disclosure, measuring the subsequent power levels is part of a consistency test with the downlink power level being constant. This way, the consistency of the DUT's power measurements may be evaluated.

In another aspect, measuring the subsequent power levels is part of a linearity test with the downlink power level varying, wherein the second range is shifted correspondingly with the varying power level in order to evaluate the linearity of the DUT's power measurements.

The second range is preferably shifted so that the middle of the second range is always at the value of the sum of the measured first power level with the difference of the current downlink power level and the initial downlink power level.

The initial downlink power level being the downlink power level at which the first power level has been measured.

To test the behavior of the DUT's power measurements thoroughly, the downlink power level may be varied in a linear manner, a non-linear manner and/or a stepwise manner.

In an embodiment, the signal generator is a protocol tester so that multiple functions may be performed by the signal generator.

In certain embodiments, the device under test is capable of performing and reporting downlink power measurements to facilitate the test.

In an embodiment, the measured first power level is discarded and the second test phase is not initiated if the measured first power level lies outside the predefined first range. Thus, only compliant measured first power levels are used to evaluate the baseband accuracy.

For above purpose, a test system for downlink power tests of a device under test is further provided, comprising, for example, a signal generator, a control unit and a test chamber having a quiet zone, wherein the device under test being arranged in the quiet zone. The signal generator is configured to generate a downlink signal with a predefined downlink power level in the quiet zone. In some embodiments, the control unit is configured to:

receive from the device under test in a first test phase a measured first absolute power level received by the device under test;

determine whether the measured first power level lies within a predefined first range around the predefined downlink power level, receive in a second test phase repeatedly measured subsequent power levels from the device under test, if the measured first power level lies within a predefined first range, and determine whether the measured subsequent power levels lie within a predefined second range around the measured first power level with respect to the current downlink power level.

The signal generator may be a protocol tester.

Further, for above purpose, a test setup for downlink power tests of a device under test is provided, having a device under test and a test system comprising, for example, a signal generator, a control unit and a test chamber having a quiet zone. The device under test is arranged in the quiet zone and the device under test is capable of performing and reporting downlink power measurements. The signal generator is configured to generate a downlink signal with a predefined downlink power level in the quiet zone. The control unit, in some embodiments, is configured to:

receive from the device under test in a first test phase a measured first absolute power level received by the device under test, determine whether the measured first power level lies within a predefined first range around the predefined downlink power level, receive in a second test phase repeatedly measured subsequent power levels from the device under test if the measured first power level lies within a predefined first range, and determine whether the measured subsequent power levels lie within a predefined second range around the measured first power level with respect to the current downlink power level.

In some embodiments, the signal generator may be a protocol tester.

The feature and advantages of the method as described above also applies to the test system and/or the test setup and vice versa.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
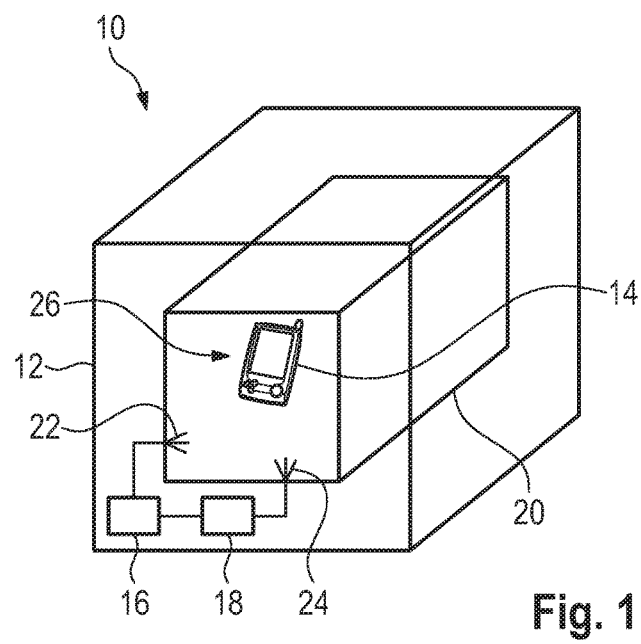
FIG. 1 shows a test setup according to the disclosure with a test system according to the disclosure.

FIG. 1 shows schematically a test setup 10 for downlink power tests having a test system 12 and a device under test 14 (DUT). The device under test 14 may be a user equipment for a wireless data network, like an LTE or a 5G network. For example, the DUT 14 is a mobile phone, a tablet, a laptop, an IoT device or any other device with a wireless interface for the specific network.

The test system 12 comprises a signal generator 16, a control unit 18 and a test chamber 20. The test chamber 20 includes a quiet zone 26 that is shielded from the radio frequency radiation in the environment of the test system 12. The test chamber 20 is for example a test chamber for over-the-air (OTA) tests. The signal generator 16 is configured to create signals within the test chamber 20 that correspond to actual signals used in the respective wireless network via an antenna 22 in the test chamber 20.

The control unit 18 is configured to receive reports from the DUT 14, for example using a second antenna 24 in the test chamber 20. The antennas 22, 24 are shown only for illustrative purposes and it is of course possible that only a single antenna with both functions is provided in the test chamber 20. The DUT 14 is configured to perform downlink power measurements and report the measurement results to the control unit 18.

To perform downlink power tests on the DUT 14 with the test system 12, measurement accuracy requirements are defined.

Measurement accuracy requirements are for example defined in a standard for wireless communication, like the LTE standard or a standard issued by the 3GPP.

The measurement accuracy requirements include baseband accuracy limits of a measurement, being for example ±6 dB, and a permitted antenna gain, e.g., limits for an antenna gain permitted within the accuracy requirements.

Figure 2:
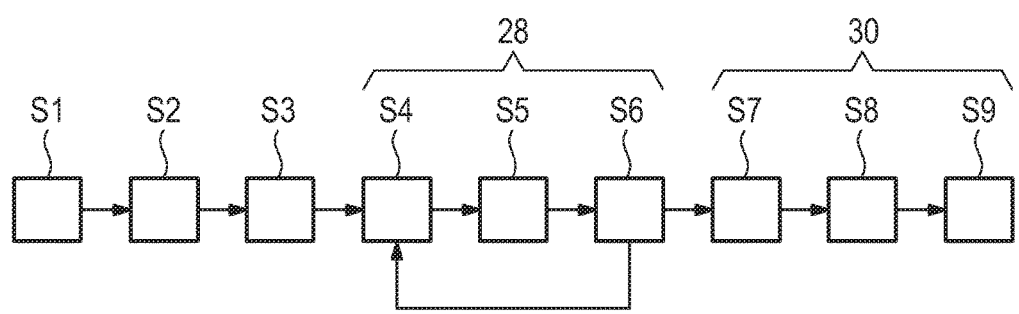
FIG. 2 shows a flow-chart of a representative method according to the disclosure.
Figure 3:
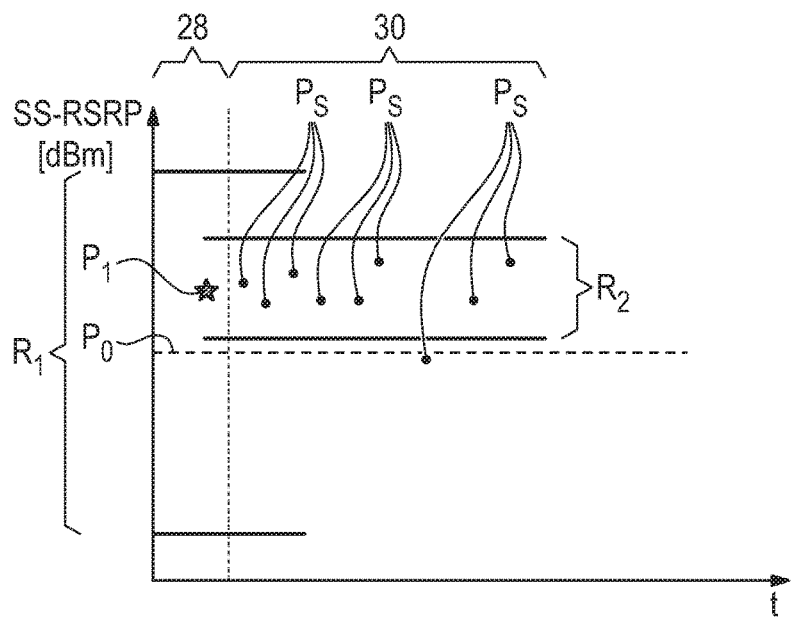
FIGS. 3 and 4 show diagrams of the measurements reported from the device under test over time during to different embodiments of the method according to the disclosure.

To perform downlink power tests on the DUT 14, e.g., to evaluate whether or not the DUT 14 fulfills the measurement accuracy requirements, a method as shown in FIG. 2 is carried out. A first embodiment of this method is also illustrated in FIG. 3.

In a first step S1, a first range $R_1$ is predefined using the measurement accuracy requirements as the sum of the baseband accuracy limits and the permitted antenna gain. Thus, the first range corresponds to the total measurement uncertainty, especially the total RSRP (Reference Symbol Received Power) measurement uncertainty. Further, a second range $R_2$ is predefined being only the baseband accuracy limit of the respective measurement accuracy requirements.

In step S2, the DUT 14 is placed in the quiet zone 26 of the test chamber 20.

In the next step S3 the control unit 18 controls the signal generator 16 to create a downlink signal, for example a downlink signal of the respective protocol, in the quiet zone 26 of the test chamber 20. The downlink signal is created such that it has a predefined downlink power level $P_0$ in the quiet zone 26. The downlink signal may be a synchronization signal, for example in a 5G NR (New Radio) environment, especially of the second frequency band (FR2).

In the next steps D4, D5 and D6, a first test phase 28 of the downlink power test is performed.

In step S4, the DUT 14 measures the absolute power level that it receives, e.g., the absolute power level of the downlink signal. The measured absolute power level at the DUT 14 of this first test phase 28 is referred to a measured first power level $P_1$. The measured first power level $P_1$ is shown as a star in FIG. 3, which shows a diagram of the power level of the measurements by the DUT 14 over time.

The DUT then transmits the measured first power level $P_1$ to the control unit 18, for example via antenna 24 (step S5). The measured first power level $P_1$ may be transmitted from the DUT 14 as a synchronization signal-reference symbol received power report (SS-RSRP report).

In step S6, the control unit 18 evaluates the received first power level $P_1$ by comparing the received first power level $P_1$ to the first range $R_1$. The first range $R_1$ is illustrated in FIG. 3.

The first range $R_1$ extends around the predefined downlink power level $P_0$ meaning that the predefined downlink power level $P_0$ lies in the center of the first range $R_1$ and extends above and below the predetermined downlink power level $P_0$ for a sum of the baseband accuracy limits and the permitted antenna gain limits of the measurement accuracy requirements. For example, if the sum of baseband accuracy limit and the permitted antenna gain is 15 dB, the first range $R_1$ extends from $P_0$−15 dB to $P_0$+15 dB.

The control unit 18 thus determines whether the measured first power level $P_1$ lies within the first range $R_1$. If the measured first power level $P_1$ lies outside of the first range $R_1$, then the measured first power level $P_1$ is discarded and the first test phase 28 is repeated, i.e. the method continuous at step S4 and does not continue to a second test phase 30 yet. If, however, the measured first power level $P_1$ lies within the first range $R_1$, as shown in FIG. 3, then the second test phase 30 comprising at least the steps of S7, S8 and S9 is initiated.

In this first embodiment shown in FIG. 3, in the second test phase 30, the predefined downlink power level $P_0$ is kept constant and in step S7, the DUT 14 measures repeatedly the absolute power level it receives. The power levels measured in this second test phase 30 are referred to as measured subsequent power levels $P_S$ in the following.

The measurements are performed at the same interval or, as seen in FIG. 3 at different intervals.

The DUT 14 transmits the measured subsequent power levels $P_S$ to the control unit 18, for example also as SS-RSRP reports (step S8).

In step S9, the control unit 18 compares the received subsequent power levels $P_S$ to the second range $R_2$. The second range extends around the measured first power level $P_1$ such that the measured first power level $P_1$ lies in the center of the second range $R_2$. The range $R_2$ then extends above and below the first measured power level $P_1$ for the baseband accuracy limit. For example, if the second range $R_2$ extends from $P_1$−6 dB to $P_1$+6 dB.

Measured subsequent power levels $P_S$ lying outside or inside the second range $R_2$ are accounted as failed iteration or successful iterations, respectively.

On the basis of the measured subsequent power levels $P_S$ it is determined, for example by the control unit 18, whether or not the device under test 14 fulfills the downlink power tests, for example the necessary measurement accuracy requirements.

This may be done for example by determining the number of failed or successful iterations over a predetermined interval, the ratio of failed iterations to successful iterations and/or any other suitable measure and comparing it to a predetermined threshold.

In the example of FIG. 3, the downlink power test is a consistency test of the device under test 14 as the downlink power level $P_0$ is kept constant.

Figure 4:
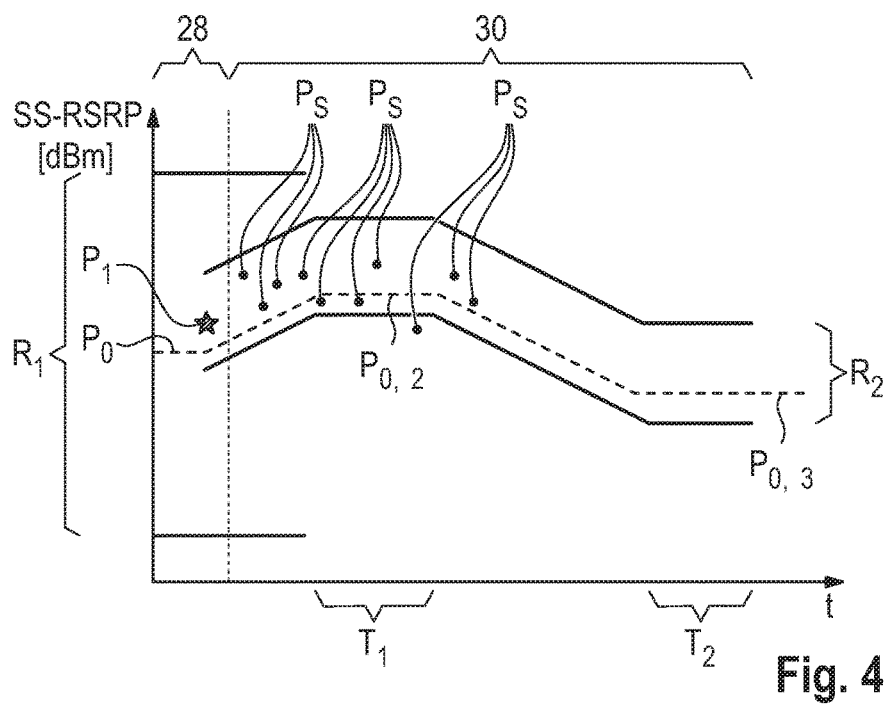

FIG. 4 shows a diagram like the one of FIG. 3 for a second embodiment of the method according to the disclosure. The method of the second embodiment corresponds in general to the method of the first embodiment so that only the differences are explained in the following. The same or functionally the same parts, steps or features are labeled with the same reference number.

The difference between the first embodiment and the second embodiment lies in the second test phase 30. In the second embodiment, the downlink power level $P_0$ is varied over time in the second test phase 30, as can be seen in FIG. 4. The variation of the downlink power level $P_0$ may be performed in a stepwise manner, a non-linear manner or, as shown in FIG. 4, in a linear manner.

In the example of FIG. 4, the downlink power level $P_0$ is increased linearly at the beginning of the second test phase 30 until a predefined second downlink power level $P_{0,2}$ is reached. The second predefined downlink power level $P_{0,2}$ is kept constant for a first period of time $T_1$.

After the first period $T_1$, the signal generator 16 is controlled by the control unit 18 to reduce the power of the download signal linearly to a third predefined downlink power level $P_{0,3}$. The third predefined downlink power level $P_{0,3}$ may be held for a second period of time $T_2$.

During the variation and the periods $T_1$, $T_2$, the DUT 14 measures the subsequent power levels $P_S$ as explained with respect to the first embodiment. However, the second range $R_2$ that the control unit 18 applies to evaluate the measurement accuracy of the device under test 14 is varied with the varying downlink power level $P_0$, $P_{0,2}$, $P_{0,3}$. More precisely, the center of the second range $R_2$ starts at the first power level $P_1$ but varies in the same way the downlink power $P_0$ varies. In other words, the second range $R_2$ is shifted upwards and downwards correspondingly with the current downlink power level.

In the first period $T_1$, the center value of the second range $R_2$ is the measured first power level $P_1$ plus the difference between the downlink power level $P_0$ at the beginning of the second test phase 30 and the downlink power level $P_{0,2}$ in the period $T_1$, i.e. $P_1+(P_{0,2}-P_0)$. Likewise, in the second period $T_2$ the second range $R_2$ extends around the first power level $P_1$ plus the difference between the downlink power levels $P_0$ and $P_{0,3}$, which is negative in this case, i.e. $P_1+(P_{0,3}-P_0)$. In between, before and after the periods $T_1$, $T_2$, the second range $R_2$ follows the current downlink power level in the same fashion.

Because of the varying downlink power level $P_0$, the control unit 18 can evaluate the linearity of the measurements of the device under test 14 so that a linearity test is carried out.

The control unit 16 may include, in some embodiments, logic for implementing the technologies and methodologies described herein. This logic of the control unit 16 can be carried out in either hardware or software, or a combination of hardware and software. In an example, the functionality of the control unit 16 could be implemented by special purpose hardware-based computer systems or circuits, etc., or combinations of special purpose hardware and computer instructions. In some embodiments, the control unit 16 includes one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof.

In an embodiment, the control unit 16 includes a microprocessor and a memory storing logic modules and/or instructions. In an embodiment, the control unit 16 includes one or more ASICs having a plurality of predefined logic components. In an embodiment, the control unit 16 includes one or more FPGA having a plurality of programmable logic components. In an embodiment, the control unit 16 includes combinations of circuits and computer program products having software or firmware instructions stored on one or more computer readable memories that work together to cause a device to perform one or more methodologies or technologies described herein. In an embodiment, the control unit 16 includes hardware circuits (e.g., implementations in analog circuitry, implementations in digital circuitry, and the like, and combinations thereof) for carrying out the functionality described herein.

It will be appreciated that one or more aspects of the methods set forth herein can be carried out in a computer system. In this regard, a program element is provided, which is configured and arranged when executed on a computer to decompose several jitter and noise components. In one embodiment, the program element may specifically be configured to perform the steps of: causing the generation of a downlink signal with a predefined downlink power level in said quiet zone; determining whether a measured first power level from a device under test (DUT) lies within a predefined first range around said predefined downlink power level, if said measured first power level lies within a predefined first range, determining whether said subsequent measured power levels from the DUT lie within a predefined second range around the measured first power level with respect to the current downlink power level.

In another embodiment, the program element may specifically be configured to perform the steps of: receiving from said device under test in a first test phase a measured first absolute power level received by said device under test; determining whether said measured first power level lies within a predefined first range around said predefined downlink power level; receiving in a second test phase repeatedly measured subsequent power levels from said device under test, if said measured first power level lies within a predefined first range; and determining whether said measured subsequent power levels lie within a predefined second range around the measured first power level with respect to the current downlink power level.

In another embodiment, the program element may specifically be configured to perform the steps of: receiving from said device under test in a first test phase a measured first absolute power level received by said device under test; determining whether said measured first power level lies within a predefined first range around said predefined downlink power level; receiving in a second test phase repeatedly measured subsequent power levels from said device under test if said measured first power level lies within a predefined first range; and determining whether said measured subsequent power levels lie within a predefined second range around the measured first power level with respect to the current downlink power level.

The program element may be installed in memory, such as computer readable storage medium. The computer readable storage medium may be any one of the computing devices, modules, instruments, analyzers, etc., described elsewhere herein or another and separate computing device, modules, instruments, analyzers, etc., as may be desirable. The computer readable storage medium and the program element, which may comprise computer-readable program code portions embodied therein, may further be contained within a non-transitory computer program product.

As mentioned, various embodiments of the present disclosure may be implemented in various ways, including as non-transitory computer program products, computer readable instructions, etc. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, optical disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. Other non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM) of any rate, cache memory (including various levels), flash memory, register memory, and/or the like. It will be appreciated that where embodiments are described to use a computer-readable storage medium, other types of computer-readable storage media may be substituted for or used in addition to the computer-readable storage media described above.

The computer-readable media include cooperating or interconnected computer-readable media, which exist exclusively on a processing system or distributed among multiple interconnected processing systems that may be local to, or remote from, the processing system.

In some embodiments, one or more computer-readable storage media is provided containing computer readable instructions embodied thereon that, when executed by one or more computing devices (contained in or associated with the control unit 16), cause the one or more computing devices to perform one or more steps of the method of FIG. 2 described herein. In other embodiments, one or more of these method steps can be implemented in digital and/or analog circuitry or the like.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method for downlink power tests of a device under test using a test system comprising a signal generator, a control unit and a test chamber having a quiet zone, the method comprising:
    arranging said device under test in said quiet zone;
    generating a downlink signal with a predefined downlink power level in said quiet zone by said signal generator;
    measuring in a first test phase a first absolute power level received by said device under test and transmitting said measured first power level to said control unit;
    determining by said control unit whether said measured first power level lies within a predefined first range around said predefined downlink power level,
    if said measured first power level lies within a predefined first range, repeatedly measuring subsequent power levels received by said device under test in a second test phase and transmitting said measured subsequent power levels to said control unit; and
    determining by said control unit whether said measured subsequent power levels lie within a predefined second range around the measured first power level with respect to the current downlink power level.

2. The method according to claim 1, wherein said first range and said second range are defined by predefined measurement accuracy requirements.

3. The method according to claim 2, wherein said second range is defined by baseband accuracy limits of said predefined measurement accuracy requirements.

4. The method according to claim 2, wherein said first range includes a permitted antenna gain of said predefined measurement accuracy requirements.

5. The method according to claim 4, wherein said first range corresponds to the sum of said baseband accuracy limits and said permitted antenna gain of said predefined measurement accuracy requirements.

6. The method according to claim 1, wherein at least one of said measured first power level and said measured subsequent power levels are transmitted to the control unit as SS-RSRP reports.

7. The method according to claim 1, wherein measuring said subsequent power levels is part of a consistency test with said downlink power level being constant.

8. The method according to claim 1, wherein measuring said subsequent power levels is part of a linearity test with said downlink power level varying, wherein said second range is shifted with said varying power level correspondingly.

9. The method according to claim 8, wherein the downlink power level is varied in at least one of a linear manner, a non-linear manner and a stepwise manner.

10. The method according to claim 1, wherein said signal generator is a protocol tester.

11. The method according to claim 1, wherein said device under test is capable of performing and reporting downlink power measurements.

12. The method according to claim 1, wherein said measured first power level is discarded and said second test phase is not initiated if said measured first power level lies outside said predefined first range.

13. A test system for downlink power tests of a device under test comprising:
    a signal generator, a control unit and a test chamber having a quiet zone, said device under test being arranged in said quiet zone,
    wherein said signal generator is configured to generate a downlink signal with a predefined downlink power level in said quiet zone; and
    wherein said control unit is configured to:
        receive from said device under test in a first test phase a measured first absolute power level received by said device under test;
        determine whether said measured first power level lies within a predefined first range around said predefined downlink power level;
        receive in a second test phase repeatedly measured subsequent power levels from said device under test, if said measured first power level lies within a predefined first range; and
        determine whether said measured subsequent power levels lie within a predefined second range around the measured first power level with respect to the current downlink power level.

14. The test system according to claim 13, wherein said signal generator is a protocol tester.

15. A test setup for downlink power tests of a device under test with a device under test and a test system comprising a signal generator, a control unit and a test chamber having a quiet zone,
    wherein said device under test is arranged in said quiet zone and said device under test is capable of performing and reporting downlink power measurements;
    wherein said signal generator is configured to generate a downlink signal with a predefined downlink power level in said quiet zone; and
    wherein said control unit is configured to:
        receive from said device under test in a first test phase a measured first absolute power level received by said device under test;
        determine whether said measured first power level lies within a predefined first range around said predefined downlink power level;
        receive in a second test phase repeatedly measured subsequent power levels from said device under test if said measured first power level lies within a predefined first range; and
        determine whether said measured subsequent power levels lie within a predefined second range around the measured first power level with respect to the current downlink power level.

16. The test setup according to claim 15, wherein said signal generator is a protocol tester.

\* \* \* \* \*